Sept. 16, 1952      A. TEPLITZ      2,610,488
UNIVERSAL COUPLING FOR ROLLING-MILL SPINDLES
Filed March 14, 1951      2 SHEETS—SHEET 2
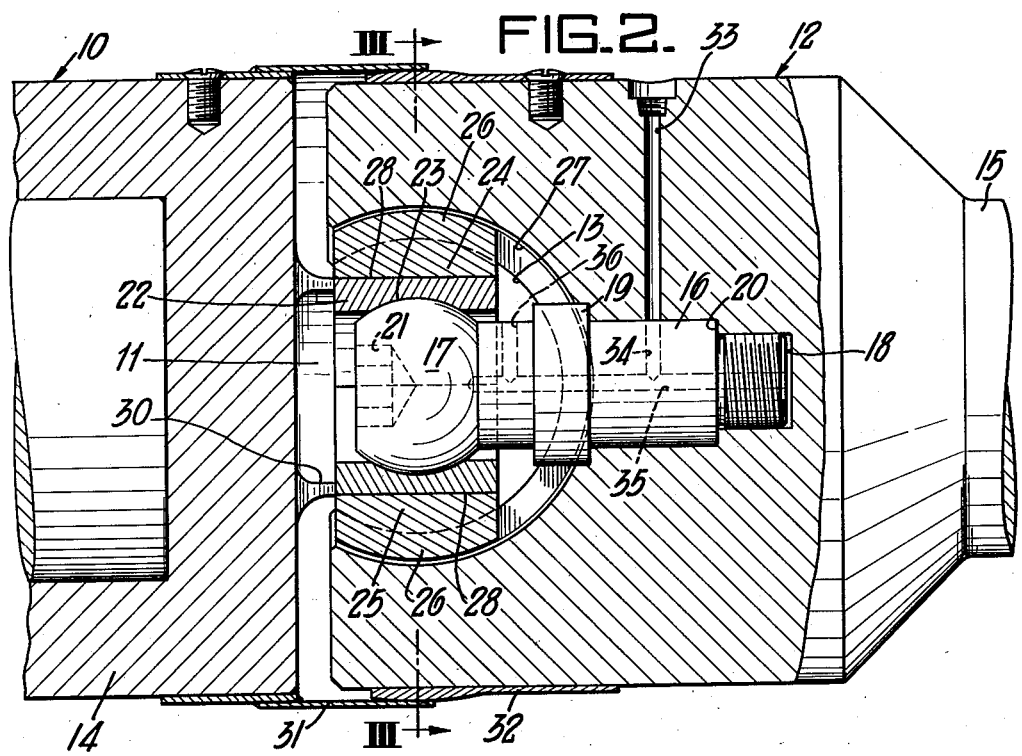
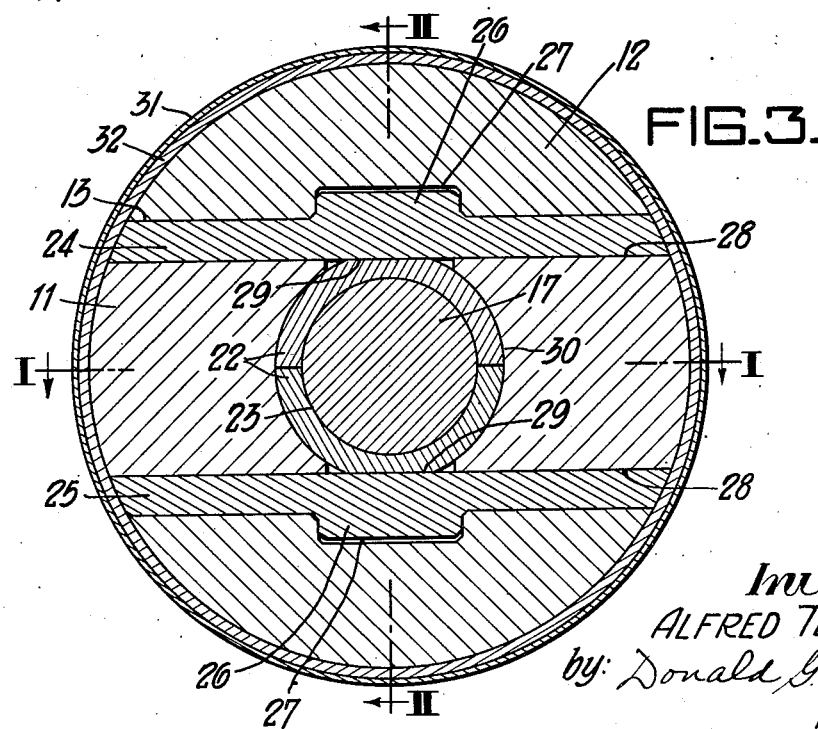
*Inventor:*
ALFRED TEPLITZ,
by: Donald G. Dalton
his Attorney.

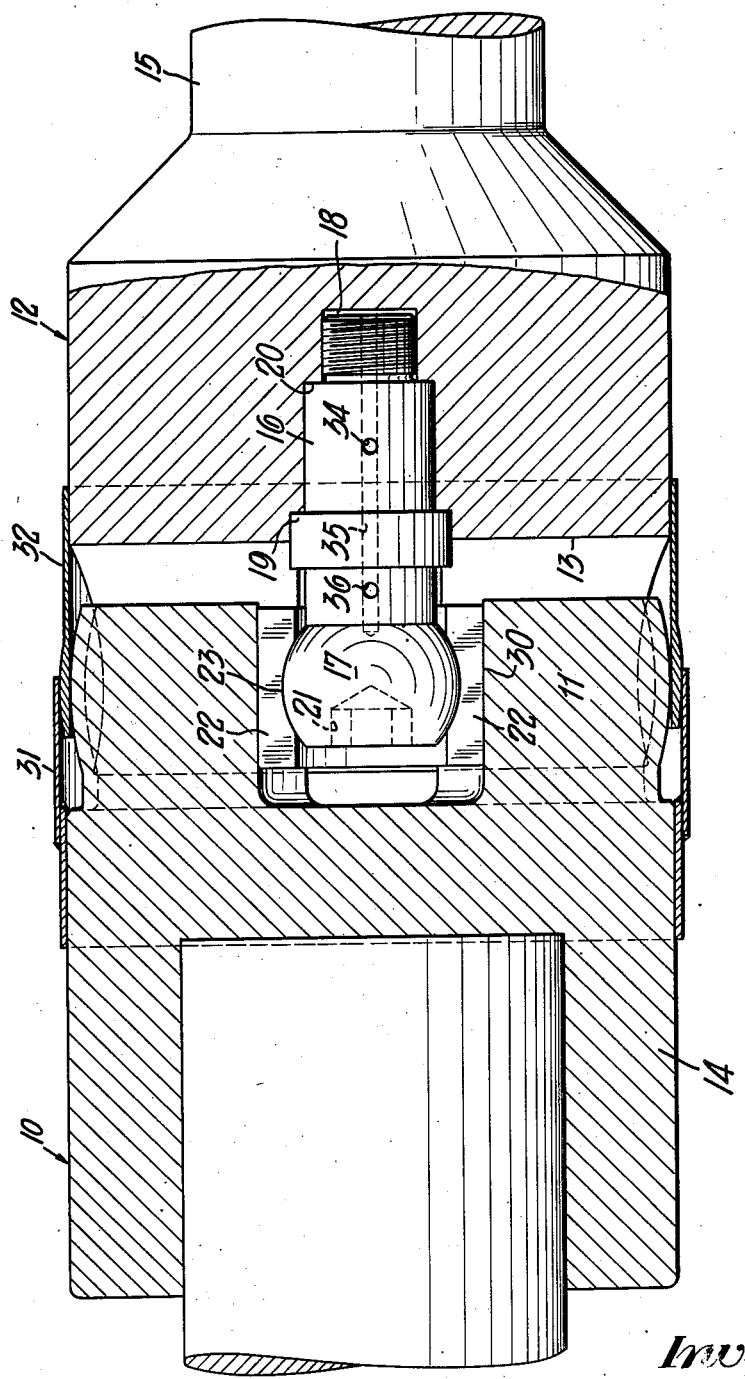

Patented Sept. 16, 1952

2,610,488

UNITED STATES PATENT OFFICE 2,610,488

UNIVERSAL COUPLING FOR ROLLING-MILL SPINDLES

Alfred Teplitz, Pittsburgh, Pa., assignor to United States Steel Company, a corporation of New Jersey Application March 14, 1951, Serial No. 215,507

3 Claims. (Cl. 64—8)

This invention relates to an improved universal coupling particularly adapted for use on the driving spindles of rolling mills.

Universal couplings in general use on mill spindles include a spade half on the mill roll and a jaw half on the driving spindle. The jaw half is slotted transversely with a cylindrical bore to receive the spade half. The jaw half is fitted with spaced segmental slipper bearings adapted to oscillate back and forth sliding circumferentially in said bore on rotation of the coupling when the axes of the halves are at an angle to each other. The slipper bearings are connected by a cross pin and the spade half of the coupling has a slot in its end to accommodate the pin when the coupling halves are brought into mating engagement. This type of coupling is shown in Iversen Patent No. 1,359,601. Wear of the contacting surfaces of the several parts of the coupling increases the normal running clearances so that there is considerable lost motion between the parts permitting relative lateral displacement and the spindle falls from side to side as the coupling turns on its axis. The resulting slapping action causes shock and impact which increase the wear and produce noisy operation. This is particularly objectionable in high-speed mills.

I have invented a novel coupling having provision for supporting the jaw half of the coupling symmetrically on the slipper bearings, thereby reducing the lost motion occasioned by wear and preventing slapping and noisy operation. In a preferred embodiment, I insert a spherical-headed bearing pin in the jaw half of the coupling so that the center of the head of the pin coincides with the intersection of the axis of the jaw half and the axis of the transverse bore therein. Independent slipper bearings are disposed between the spade half and the walls of the transverse bore in the jaw half. A cylindrical sleeve having a spherical interior surface embraces the head of the pin. The sleeve has flats on its exterior in contact with the plane inner faces of the slipper bearings. The spade half has an axial bore in its end fitting snugly on the sleeve. By this construction, excessive relative lateral displacement of the parts is prevented. The jaw half or spindle end of the coupling is carried by the sleeve and the sleeve has an accurately fitted bearing socket in the spade end so the point of intersection of the axis of the jaw half with that of the spade half is fixed, yet freedom for limited angular and axial movement of the coupling halves is preserved.

A complete understanding of the invention may be obtained from the following detailed description and explanation thereof which refer to the accompanying drawings illustrating the preferred embodiment and practice. In the drawings, Figure 1 is a partial axial section through the two coupling halves in a plane parallel to the inner faces of the slipper bearings, with parts in elevation;

Figure 2 is a similar section taken on a plane normal to that of Figure 1; and

Figure 3 is a cross-section taken on the plane of line III—III of Figure 2. Lines I—I and II—II of Figure 3 show the planes on which the sections of Figures 1 and 2, respectively, are taken.

Referring now in detail to the drawings, the coupling of my invention comprises a spade half 10 having a transverse blade or tongue 11 projecting from the end thereof and a jaw half 12 having a transverse bore 13 therethrough. The axis of the bore is so positioned relative to the end of the jaw half that a slot-like opening is formed in the end thereof adapted to receive the blade or tongue 11. The spade half is formed on a sleeve 14 bored to receive the drive end of a mill roll and keyed thereto. The jaw half is formed at the end of a spindle 15 extending from a pinion stand (not shown) to the mill. A coupling similar to that shown is disposed between the spindle and the pinion stand to permit vertical adjustment of the roll axis relative to the axis of its driving pinion.

A pin 16 has a spherical head 17 at one end and is reduced and threaded at the other so it may be screwed into an axial tapped hole 18 in the jaw half 12. The pin has shoulders 19 and 20 and the hole 18 is correspondingly counterbored to form seats therefor whereby to position the center of head 17 accurately on the axis of bore 13 when the pin is screwed home. The pin has a non-circular socket 21 in the head end adapted to receive a correspondingly shaped turning tool such as a hexagonal bar.

A split sleeve 22 having a spherical inner surface 23 is assembled about the head 17 of pin 16. Spaced segmental slipper bearings 24 and 25 are disposed between the blade or tongue 11 of the spade half of the coupling and the opposed sides of bore 13. These bearings oscillate back and forth about the center of the bore as the coupling turns, when the spindle is disposed at an angle to the axis of the spade half 10. Tongues 26 on the bearings fit in a circumferential groove 27 in the bore 13 to prevent endwise movement of the bearings in the bore. The distance between the inner plane faces 28 of the bearings is less than the outside diameter of sleeve 22 and the latter has flats 29 thereon at diametrically opposite portions thereof for engagement with the bearings. Tongue 11 of the spade half 10 has an axial bore 30 snugly fitting the sleeve 22. The tongue slides on sleeve 22 thus permitting limited telescoping of the spade and jaw halves as necessitated by changes in the angularity of the spindle relative to the mill roll. The diameter of bore 30 is greater than the thickness of tongue 11 and the flats 29 are thereby exposed to direct contact with faces 28 of bearings 24 and 25.

Lubricant-retaining sleeves 31 and 32 are mounted on the halves 10 and 11, respectively, and have a universal telescoping fit. A radial lubricant passage 33 normally closed at its outer end by a plug (not shown) is so located in jaw half 12 as to be alined with a radial passage 34 in pin 16 when the latter is screwed home. Passage 34 conducts lubricant to the interior of bore 13 by axial and radial passages 35 and 36 in the pin.

The various parts of the coupling described above may be assembled as follows:

a. Slipper bearings 24 and 25 are set in place and held temporarily by suitable means (wood blocks, etc.).

b. The two halves of the sleeve 22 are placed on the head of pin 16 and are held temporarily in place by suitable means (wire or cord).

c. Pin 16 is screwed into hole 18 and turned home. Sleeve 22 is rotated on its axis so that its flats 29 will engage the surfaces 28.

d. Lubricant-retainer sleeve 31 is slid over the spade half 10 and retainer sleeve 32 is slid over jaw half 12.

e. The spade half 10 is moved into its operating position so that its tongue 11 engages the slipper bearings and the exterior cylindrical surface of sleeve 22.

f. The lubricant retainers 31 and 32 are then permanently positioned.

From the inspection of the drawings, it will appear that the apexes of the two coupling halves always intersect at a fixed point (relative to the jaw half 12) and that the angle between them can vary freely and infinitely from 0° to a limiting figure of about 5°, determined by the proportions of the parts. It will be apparent by inspection that the two coupling halves may move to and from each other within limits determined by the proportioning of the parts, without affecting the angular motions of the coupling. Torque is transmitted through the coupling by the pressure of the tongue of the spade half 10 on the slipper bearings 24 and 25.

Pin 16 being fixed relative to the spindle on jaw half 12 of the coupling, the radial lost motion between the two coupling halves is only the running clearance plus such wear as may occur on the surfaces of one slipper bearing and the surfaces in contact therewith, instead of being twice this amount as in a conventional coupling in which the slipper bearings together are free to move bodily in the bore in the jaw half. This reduces the slapping of the bearings and the noise caused thereby.

It will be apparent from the foregoing that the invention provides a ball and socket joint at the articulation point of the conventional universal coupling, the ball being fixed on the jaw half. The ball and socket joint is designed to prevent any relative lateral displacement of the parts and at the same time permit the necessary angular and longitudinal displacements to take place. Thus, the spindle is kept in its correct theoretical position regardless of the amount of wear of the slipper bearings which may occur due to the driving loads. It will be noted that no driving loads are carried by the ball and socket joint. It carries only the portion of the spindle weight not sustained by the spindle carrier, plus centrifugal loads resulting from unbalance. The latter are kept to a minimum because the ball and socket joint forces the spindle to rotate about its centroidal axis at all times.

Although I have disclosed herein the preferred embodiment of my invention, I intend to cover as well any change or modification therein which may be made without departing from the spirit and scope of the invention.

I claim:

1. In a universal coupling including a jaw half having a transverse bore therethrough, one side of which is open to the end of said half, a spade half extending into said bore through said open side and spaced slipper bearings oscillatable in said bore one on each side of the spade half, the combination therewith of a ball member mounted coaxially on the jaw half with its center on the axis of said bore, and a sleeve having a spherical interior surface embracing said ball member, said spade half having its outer end recessed to receive said sleeve, said sleeve being cylindrical on the exterior, at least for the most part.

2. The coupling defined by claim 1 characterized by said sleeve having diametrically opposed flats engaging said slipper bearings to maintain them in spaced relation.

3. The coupling defined by claim 1 characterized by said sleeve being split to permit its being disposed over the ball member.

ALFRED TEPLITZ.

REFERENCES CITED

The following references are of record in the file of this patent:

UNITED STATES PATENTS

| Number | Name | Date |
| --- | --- | --- |
| 1,037,614 | Graham | Sept. 3, 1912 |
| 1,839,602 | Shakely | Jan. 5, 1932 |